(No Model.) 5 Sheets—Sheet 1.

E. BEARD.
SAW MILL.

No. 440,388. Patented Nov. 11, 1890.

Witnesses
Geo. W. Young.
N. E. Oliphant

Inventor
Edwin Beard
By H. G. Underwood
Attorney (No Model.) 5 Sheets—Sheet 2.

E. BEARD.
SAW MILL.

No. 440,388. Patented Nov. 11, 1890.

(No Model.) 5 Sheets—Sheet 3.
E. BEARD.
SAW MILL.

No. 440,388. Patented Nov. 11, 1890.

Witnesses
Geo. W. Young.
N. E. Oliphant.

Inventor
Edwin Beard.
By H. G. Underwood
Attorney (No Model.) 5 Sheets—Sheet 4.

E. BEARD.
SAW MILL.

No. 440,388. Patented Nov. 11, 1890.

Witnesses
Geo. W. Young
N. E. Oliphant

Inventor
Edwin Beard
By H. G. Underwood
Attorney (No Model.) 5 Sheets—Sheet 5.

E. BEARD.
SAW MILL.

No. 440,388. Patented Nov. 11, 1890.

Witnesses
Geo. W. Young.
N. E. Oliphant.

Inventor
Edwin Beard
By H. G. Underwood
Attorney

UNITED STATES PATENT OFFICE.

EDWIN BEARD, OF MILWAUKEE, WISCONSIN.

SAW-MILL.

SPECIFICATION forming part of Letters Patent No. 440,388, dated November 11, 1890.

Application filed May 19, 1890. Serial No. 352,317. (No model.)

*To all whom it may concern:*

Be it known that I, EDWIN BEARD, of Milwaukee, in the county of Milwaukee, and in the State of Wisconsin, have invented certain new and useful Improvements in Saw-Mills; and I do hereby declare that the following is a full, clear, and exact description thereof.

My invention relates to saw-mill machinery; and it consists in certain peculiarities of construction and arrangement of parts whereby in one machine I combine a carriage, power set-works, block and dog receding mechanism, a dog-releasing and log-canting mechanism, a dog-setting mechanism, and a timber and shingle cant discarder, all of said mechanisms except the carriage being under the direct control of a single operator mounted on the machine, as will be hereinafter described with reference to the accompanying drawings, and subsequently claimed.

Figure 1:
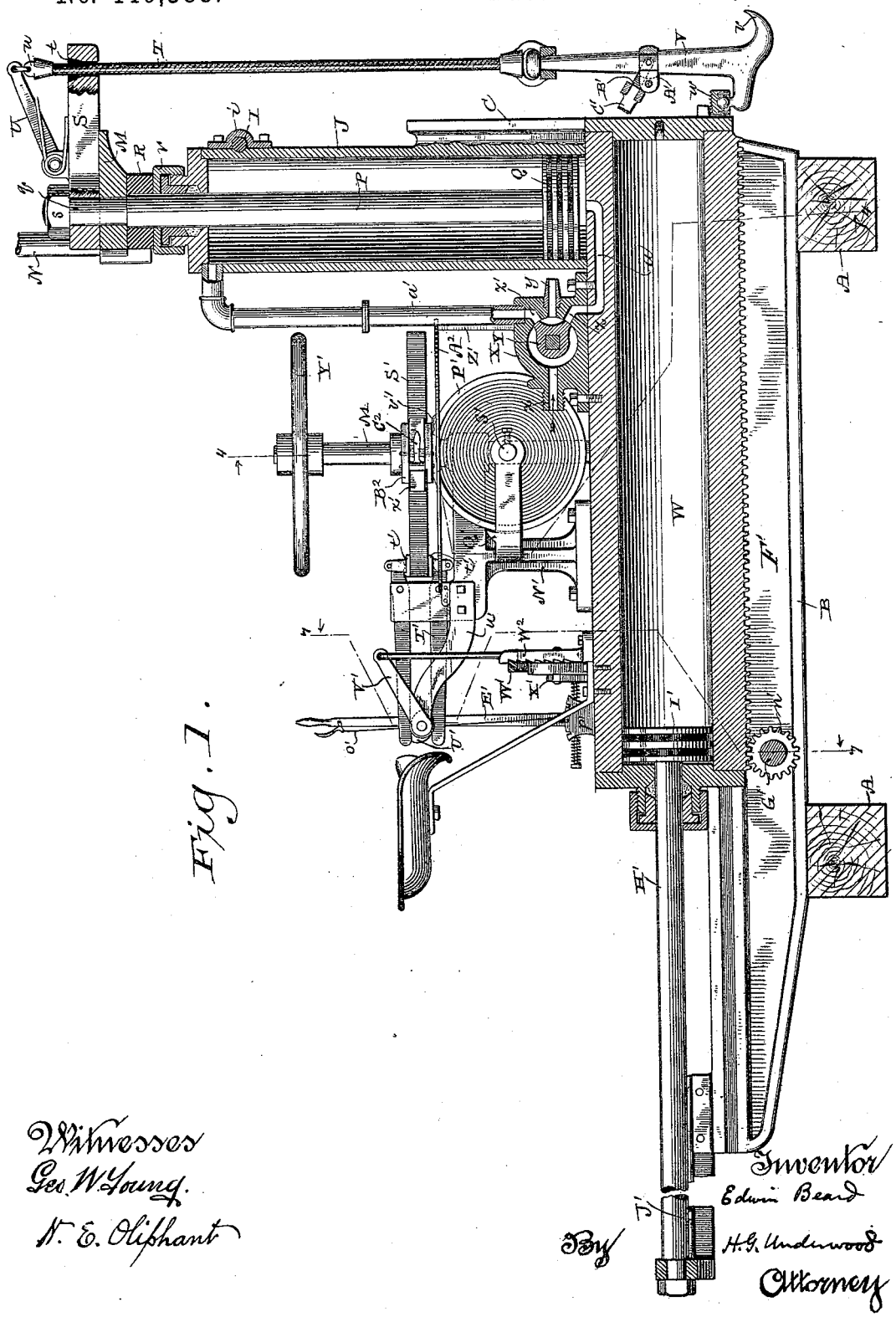
Figure 2:
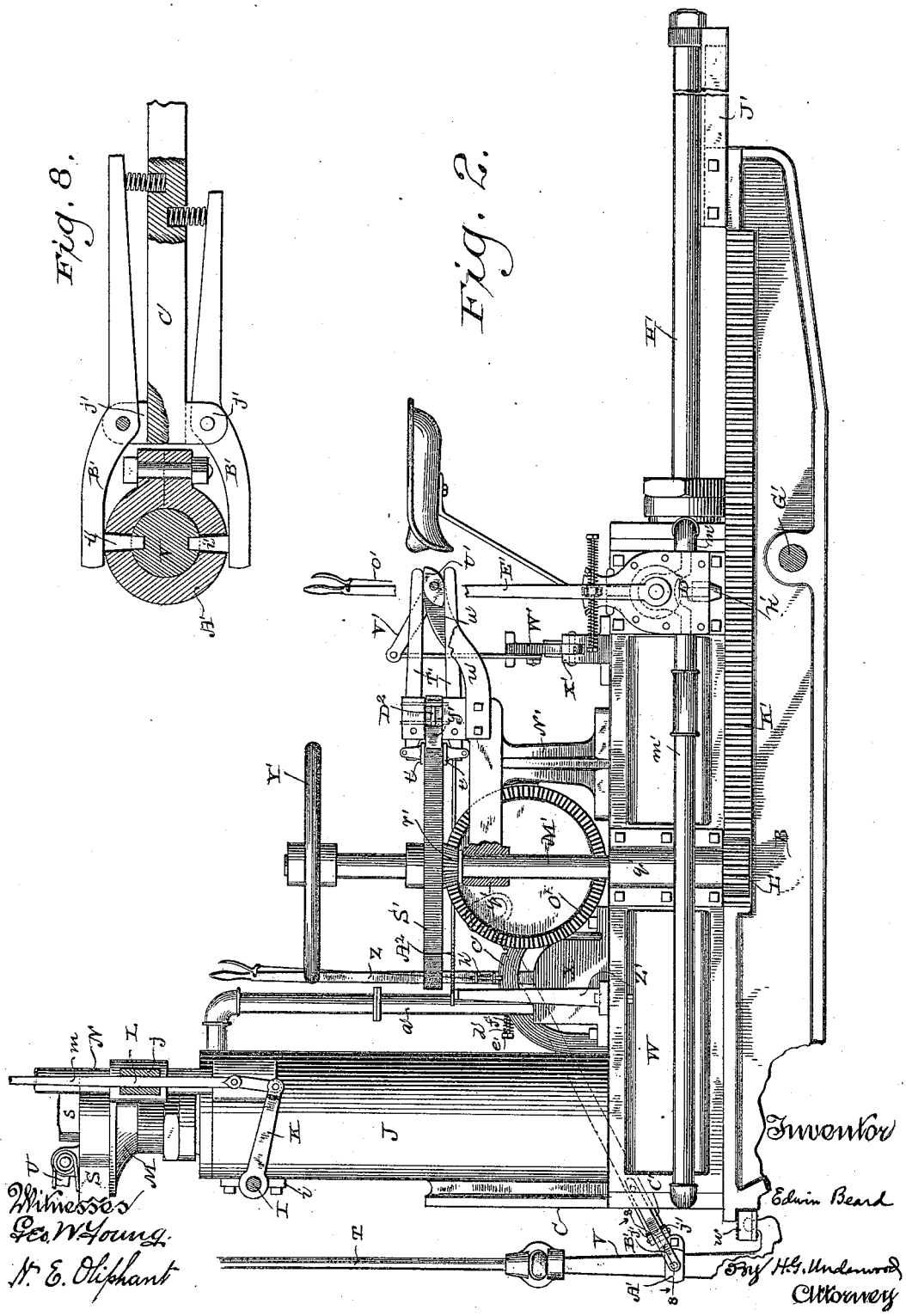
Figure 3:
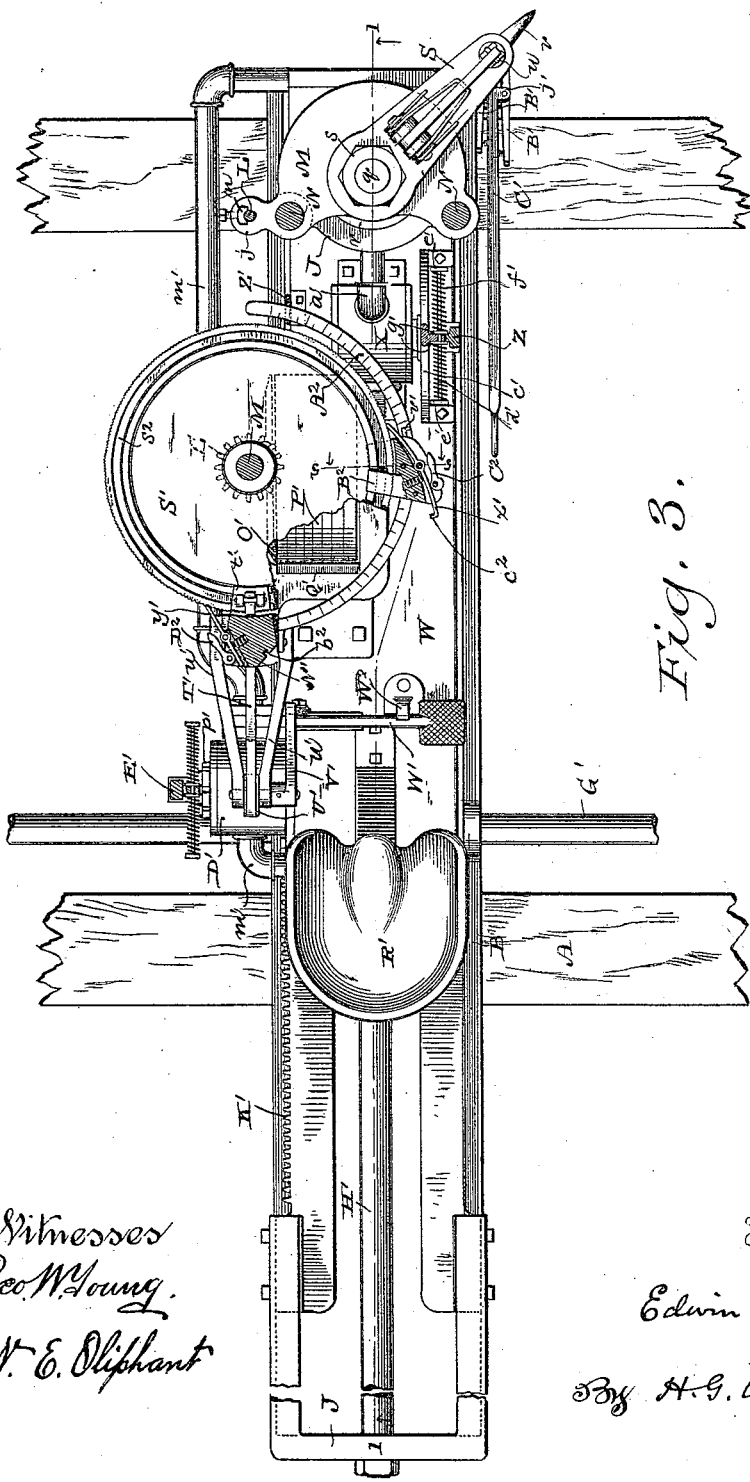
Figure 4:
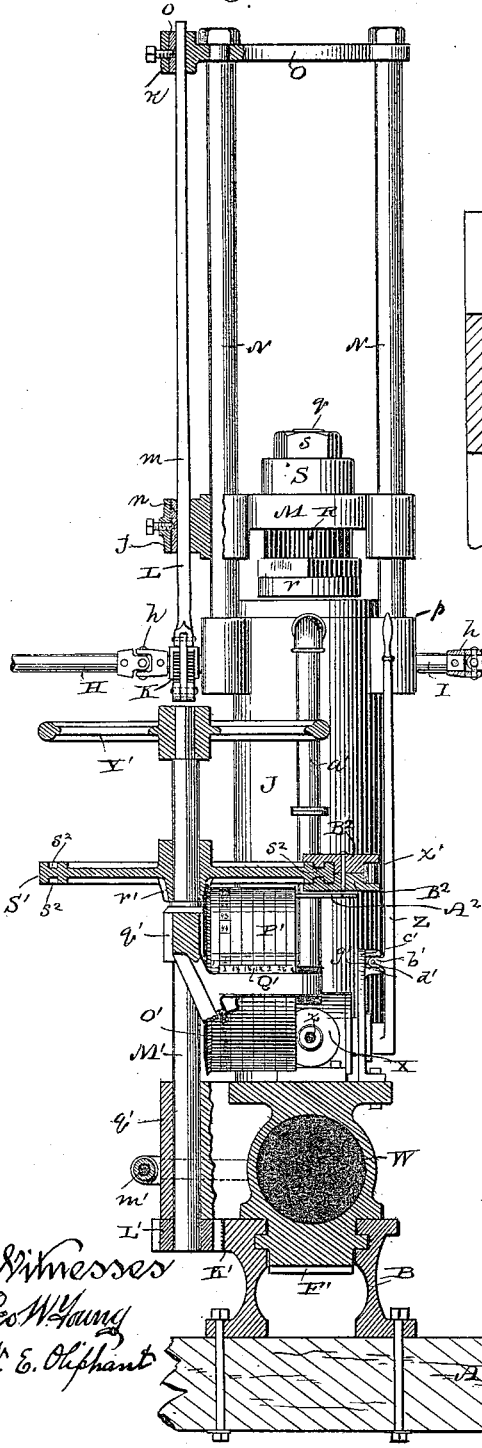
Figure 5:
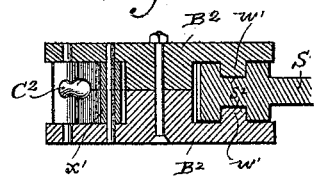
Figure 6:
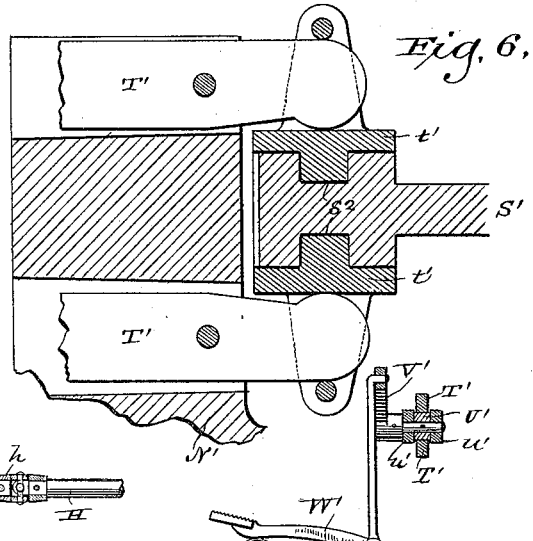
Figure 7:
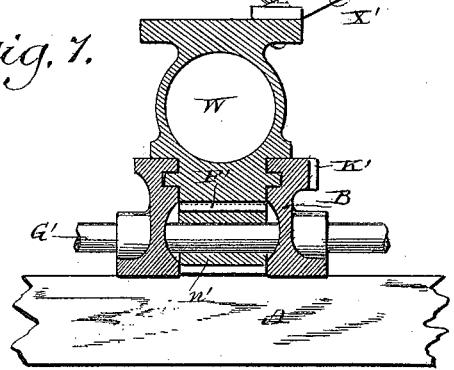
Figure 9:
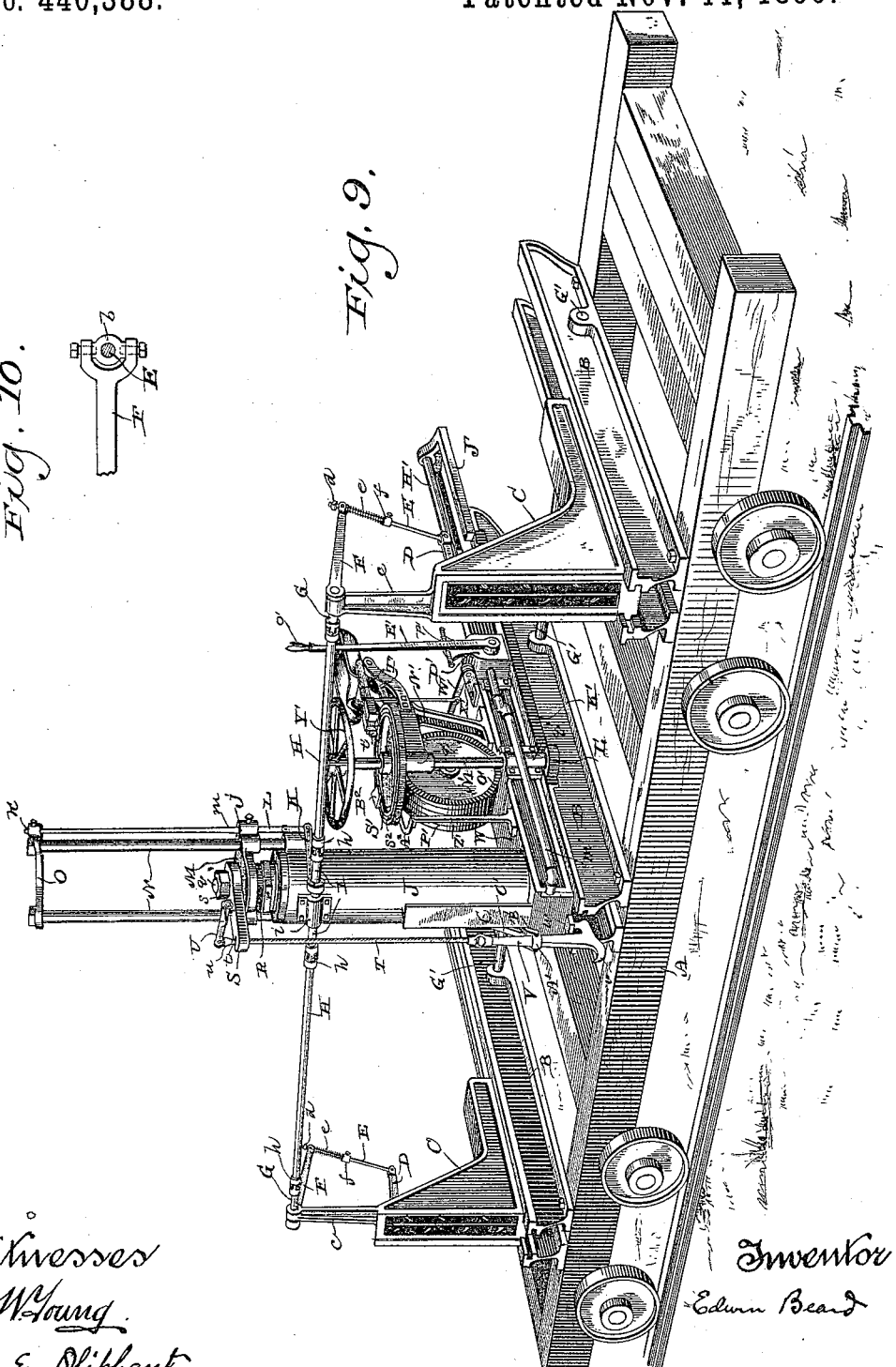
Figure 10:
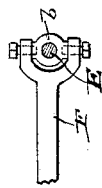

In the drawings, Figure 1 represents a right side elevation of my machine, partly in section, on line 1 1 of Fig. 3; Fig. 2, a left side elevation of the machine with parts broken away; Fig. 3, a plan view of said machine with parts broken away and in horizontal section; Fig. 4, a rear elevation, partly in section, on line 4 4 of Fig. 1; Fig. 5, a detail sectional view on line 5 5 of Fig. 3; Fig. 6, a detail sectional view of a brake mechanism that forms part of the machine; Fig. 7, a detail elevation, partly in section, on line 7 7 of Fig. 1; Fig. 8, a detail sectional view on line 8 8 of Fig. 2; Fig. 9, a perspective view of my machine, and Fig. 10 a detail plan view of a swivel-joint employed in my machine.

Referring by letter to the drawings, A represents a saw-mill carriage provided with bed-pieces B, and reciprocative on the bed-pieces are knees C, provided with double-tooth dogs, as is usual in the art to which my invention relates. Pivotally connected to the dog-levers D are rods E, that pass through swivels $b$, connected to arms F on shaft-sections G, the latter having their bearings in vertical standards $c$ on the knees C, as is clearly illustrated in Fig. 9. The free ends of the rods E receive stop-nuts $d$, that limit the upward movement of the arms F, the swivels $b$, connected to said arms, being opposed by spiral springs $e$, arranged on the rods E, and adjusted as to tension by means of set-collars $f$, also arranged on said rods.

By universal couplings $h$ the shaft-sections G are connected to similar sections H, and similar couplings unite the latter shaft-sections with a like section I, that has its bearing $i$ on a vertical cylinder J and is provided with a lateral arm K, the latter having a link-connection to a vertical rod L, that moves in guides $j$ $k$, and has a tapered portion $m$ relative to an adjustable gib $n$ in the guide $j$, while at the same time the guide $k$ is also provided with an adjustable gib $o$, said gibs being clearly illustrated in Fig. 4. The guide $j$ is formed on a cross-head M, that works on vertical rods N, stepped in sockets $p$ on the cylinder J, and these rods are connected at their upper ends by a brace O, formed with the guide $k$, as is also best illustrated in Fig. 4. The cross-head M is slipped onto the reduced and shouldered upper end $q$ of the rod P, connected to a piston Q, that works in the cylinder J, and interposed between said cross-head and the stuffing-box or bearing $r$ for the piston-rod is an elastic bumper R.

Loosely arranged on the upper end of the piston-rod P, between the cross-head M and a nut $s$, is a rotary adjustable arm S, the latter being provided at its outer end with a vertical opening having an enlarged tapered portion $t$, that forms a socket for the reception of a corresponding shackle $u$ on the upper end of a cable T, and said shackle is linked to a spring-controlled lever U, trunnioned in bearings on the upper face of said arm. The lower end of the cable T is swiveled to the shank of a two-prong cant-hook V, one prong $v$ of this cant-hook being sharpened to a point and the other prong terminated in a knob swiveled in a serrated grip $w$, the purpose of this construction being hereinafter described.

The vertical cylinder J is supported on a horizontal cylinder W, and a chest X, mounted on a horizontal cylinder, has an inlet-port $x$ for connection with a source of fluid under pressure, (compressed air being the preferred fluid,) and an exhaust-port $y$, while at the same time ports $z$ $z'$ belonging to said chest are in communication with conduits $a$ $a'$, leading into the vertical cylinder J on opposite sides of the piston Q, as is clearly illustrated in Fig. 1. The ports $z$ $z'$ of the chest X are controlled by a rotary valve Y, and the set of this valve is preferably such as to have said ports partially opened to the exhaust-port $y$ when the valve-lever Z is on center or in its normal position, whereby any of the actuating-fluid remaining in the cylinder J may escape.

The valve-lever Z is provided with a right-angle lug $b'$, that is normally straddled by two lugs on a quadrant $c'$, and passed through the lever-lug is a rod $d'$, provided at its ends with set-nuts $e'$, that serve as a means for adjusting the tension of spiral springs $f'$ on said rod in opposition to loose washers $g'$, the latter being on opposite sides of said lever-lug and of a diameter sufficient to overlap the quadrant-lugs, whereby I provide for a yielding resistance to the valve-lever in either direction of its movement, this construction being similar to what is shown and described in my patent, No. 392,841, of November 13, 1888. The valve-lever is also preferably provided with a spring-latch $h'$ for engagement with notches in the quadrant $c'$, and thus said lever may be locked to said quadrant.

Fitted to the shank of the cant-hook V is a loose collar $A'$, provided with lateral openings that register with similar openings in said shank, and all of said openings are engaged by lugs $i'$ on the adjacent ends of spring-controlled arms $B'$, pivotally connected to lugs $j'$ on a hand-bar $C'$, the latter serving as a means for directing said cant-hook and rotary adjustable arm S of the lifting mechanism or device connected therewith to the desired position with relation to a timber. By means of the clutch-connection formed by the pivoted spring-controlled arms $B'$, having the lugs $i$ in engagement with the openings in the collar $A'$ and shank of the cant-hook, the latter is held in the desired adjustment to bring one or the other of its prongs in position to engage with the timber to be canted, the depression of said arms and a half-revolution of said cant-hook being sufficient to effect said adjustment. The sharp prong $v$ of the cant-hook is for engagement with logs and the serrated grip $w$ on the other prong is designed to bear against sawed sides of the timber, whereby I prevent the latter from being damaged.

The horizontal cylinder W is provided with a chest $D'$ for connection with a source of fluid under pressure, and, like the chest X, it has an exhaust-port $k'$, and ports (shown in dotted lines, Fig. 2) in said chest communicate by means of conduits $m'$ with opposite ends of said cylinder. A rotary valve, (also shown in dotted lines, Fig. 2,) similar to the valve Y in the chest X, controls the ports of the chest $D'$ and is actuated by a lever $E'$, the latter being provided with a spring-latch mechanism $o'$ for engagement with a quadrant $p'$, that projects above said chest $D'$, and a mechanism precisely like that described in connection with the valve-lever Z is employed to form a yielding resistance to the movement of said lever $E'$ in either direction from its normal position.

The under side of the horizontal cylinder W is provided with a rack $F'$ in mesh with a pinion $n'$ on a shaft $G'$, that has its bearings in the bed-pieces B, and the rod $H'$ of the piston $I'$ in said cylinder is anchored to a block $J'$ on the rear of the center bed-piece. By the construction just described it will be seen that when pressure is exerted in the horizontal cylinder the latter is moved, the piston therein being the stationary part, and, as is common in the art to which my invention relates, the shaft $G'$ is geared to the outer knees C, in order to give the latter a movement corresponding to that of said cylinder. Owing to the lack of novelty in the gearing just described, in connection with the shaft G and knees C, I have not considered it necessary to illustrate the same, it being nothing more or less than common rack-and-pinion gear.

One side of the center bed-piece is provided with a rack $K'$, and in mesh with this rack is a pinion $L'$ on a vertical shaft $M'$, that has its bearings $q'$ on the horizontal cylinder W, and an arm of a standard $N'$, bolted or otherwise secured to the top of said cylinder. The shaft $M'$ is provided with a bevel-pinion $r'$ in mesh with a bevel gear-wheel $O'$, arranged to turn on a stud $s'$, that projects from another arm of the standard $N'$, and said gear-wheel has an annular flange $P'$, extending therefrom and provided with a series of scales graduated to inches and to inches plus certain fractions thereof, these scales being in register with a correspondingly-graduated plate $Q'$ on an arm of said standard, as is clearly illustrated in Fig. 4. Hereinafter the flange portion $P'$ of the gear-wheel $O'$ will be referred to as the "index-wheel," and attention is called to the fact that this index-wheel is in easy view of an operator mounted on a seat $R'$, secured to the top of the horizontal cylinder.

The bevel-pinion $r'$ on the shaft $M'$ forms part of the hub of a wheel $S'$, that has a serrated periphery and upper and lower annular grooves $s^2$, these grooves being engaged by corresponding brake-blocks $t'$, connected to levers $T'$, pivoted to an arm of the standard $N'$ and arranged to oppose a spreader-cam $U'$, that is trunnioned in brackets $u'$, extended rearward from said arm of the standard. A lever-arm $V'$, connected to a trunnion of the spreader-cam $U'$, is linked to a spring-controlled foot-treadle $W'$, pivotally secured to a bracket $X'$ on the horizontal cylinder, as is best illustrated in Fig. 7, and this treadle being within easy reach of the operator on the seat $R'$, the rotation of the wheel $S'$ may be checked at will. I also prefer to provide the vertical shaft $M'$ with a hand-wheel $Y'$ in order that the operator may have further control of the wheel $S'$, and it is also preferable to arrange a stop-rack W² on the horizontal cylinder W for engagement with the treadle W', as is best illustrated in Fig. 1.

Connected to the standard N' and another standard Z' on the horizontal cylinder is a graduated segment A², and a pointer or index-finger v', relative to the segment, extends out from a clip B², having lugs w', that engage the grooves s² in the wheel S'. Pivotally connected to the clip B² is a spring-controlled pawl x', that normally engages the serrations in the periphery of the wheel S', but which may be held out of such engagement by a cam-lever C², that is also pivotally connected to said clip. A spring-controlled detent y' is pivotally connected to an arm of the standard to also normally engage the serrations in the periphery of the wheel S' and prevent the latter from moving in the wrong direction; but this detent may be held out of such engagement by means of a cam-lever D², that is also pivotally connected to said arm of the standard, and attention is called to the fact that this arm of said standard is provided with a notch b² for engagement with a hook c² on the pawl x', when it is desirable to lock the clip B² against travel with said serrated wheel.

In describing the operation of the machine we will assume that we have completed the sawing of a timber and that the several parts shown in the drawings are in the position they assume, at such a time. The clip B² is now moved back on the wheel S' and the cam-lever C² actuated to bring the pawl x' out of engagement with the serrated periphery of said wheel, the hook c² on said pawl being thus brought into engagement with the notch b² in the adjacent arm of the standard N', for the purpose above described. At the same time the cam-lever D² is actuated to bring the detent y' out of engagement with the serrated periphery of the wheel S', and thus the latter is free to move in a reverse direction. The lever E' is now moved to the rear to operate the valve D', so as to admit the fluid under pressure to the rear of the horizontal cylinder, and by means of the spring-latch and notched quadrant above described in connection with said lever the latter may be held in its adjusted position. The pressure exerted between the rear head of the cylinder and the stationary piston I' causes said cylinder to recede, and this movement is transmitted to the outer knees C by suitable gearing, as above described. When the movable parts on the bed-pieces B have been receded a suitable distance to accommodate the next log to be sawed, the foot-treadle W' is actuated to set the brake-blocks t' against the wheel S', and thereby hold said movable parts against the power of the fluid under pressure. The log is now placed on the bed-pieces, and if said log is larger at one end than the other it will stand at an angle to the line of the knees. To correct the position of the log and bring the latter against all the knees, the cant-hook V is placed over in front of said log and engaged therewith, after which the lever Z is moved toward the rear to actuate the valve Y, and thereby admit fluid under pressure to the lower end of the cylinder J. By the upward travel of the piston Q in the cylinder motion is imparted to the parts connected to its rod P, and the gib n in the guide j, being tight against the thickest portion of the vertical rod L, the latter is drawn up by the cross-head M to actuate the arm K, and through it the sectional shaft having the arm-and-rod connections with the dog-levers D, whereby the latter are moved in the reverse direction. The resistance of the dog-levers to further movement causes the gib n to slip along the tapered portion m of the rod L as the cross-head continues its upward movement, and at this time strain is exerted by the cable T to lift the cant-hook, and thereby turn the log up even against all the knees, said rod L' being held up by the friction of the gib o in the guide k to prevent the return of the dogs. The cant-hook is now removed from the log and swung back of the latter out of the way, and the piston Q, reaching its limit of travel in the cylinder, the cross-head M and pivotal arm S on the piston-rod P are held up by the pressure in said cylinder. The log being against the knees of the machine, the lever Z is reversed to cause a downward movement of the piston Q, and thus the dogs are operated by the mechanism above described to engage said log. In case the log is back of the saw-line, the lever E' is moved forward to admit fluid under pressure to the front end of cylinder W, and the latter, with its several connections and said log, is moved forward the desired distance and stopped and held by the brake mechanism in clutch with the wheel S', this brake mechanism being actuated by the foot-treadle W'. The carriage A is now moved in the proper direction and a slab is cut from the log. While the slab is being cut, the operator on the machine actuates the cam-lever C² to disengage the hook c² on the pawl x' from the notch b² in an arm of the standard N', after which the clip B² is moved forward until its index-finger v' is at the point on the graduated segment A² that indicates the width for the next cut, and said cam-lever is further actuated to permit of an engagement of said pawl with the wheel S', the cam-lever D² being also actuated to allow the detent y' to come into engagement with said wheel. The carriage is now gigged back, and this being accomplished the operator on the machine lets upon the foot-treadle W', and the pressure in the cylinder W causes the log to be advanced toward the front, the wheel S' being actuated by the rack-and-pinion gear K' L' to bring the clip B² toward the standard N', and on the arrival of said clip at this point the brake mechanism is again set and said log is in position for another cut of predetermined thickness. It will be understood that the clip B² is set forward on the segment-plate A² for every cut taken from the log prior to the cut that precedes a cant. When it is desirable to cant the log and the carriage is run back to clear the saw, the operator manipulates the hand-bar C' to place the cant-hook V in position, and by pressure exerted in the cylinder J the dogs are released, as above described, and the socket $t$ in the arm S on the piston-rod P comes into engagement with the shackle $u$ on the cable T. The continued upward movement of the arm S exerts a pull on the cable and the canting operation begins, the lever E' having been actuated in the proper direction to permit of a rear movement of the knees to give room for the log as it turns over. The log having been canted, the knees are brought up against the same, as above described, the dogging operation repeated, and said log moved forward to come in line with the saw, after which the operation relative to the slab cut and any succeeding cuts is repeated in the manner above specified. The log in the position last described has its first flat side on the bed-pieces B, and after the last cut on the side toward the saw the log is receded the full limit on said bed-pieces, the dogs withdrawn from the log, and the latter canted. The several operations with relation to the log are effected during the time the carriage is on its back run, and this is one of the main objects of my invention. The log is again dogged and moved forward to be sawed, and in its new position said log will have one flat side against the knees and another against the the bed-pieces. The next or third cant of the log and the necessary operations just previous thereto are performed in a like manner to what was described in connection with the second cant. Up to the time of the third cant of the log the sharp prong $v$ of the cant-hook V has been employed; but previous to said cant the cant-hook is reversed to bring the serrated grip $w'$ thereon in position to engage against the lower flat side and square corner of said log. After the slab has been removed from the third cant of the log the timber is in the square. Now if the remaining cant is to be put into shingle and is too wide to handle on a shingle-bolter, the friction-brake mechanism is let off from the wheel S' and said cant moved forward to bring its center in line with the saw. The cant being split, the friction-brake mechanism is again let off, the cant remaining on the bed-pieces after the split is discarded, the dogs having been released at the proper time. Assuming that when the timber is in the square, as above described, and it is desirable to cut the same into boards, the clip B² is set to a point on the graduated segment A² that will indicate the desired thickness of cut plus the fractional part of an inch equal to the thickness of the saw. This being done and the timber moved forward, the index-wheel P' is actuated by the gear mechanism above described to show the setter the width left in the timber, whereby he can always calculate just how to set his timber for succeeding cuts, so that the last cut will leave a board of standard thickness.

The machine shown is proportioned for setting to exact inches and fractions thereof down to one-sixteenth without auxiliary adjustments; and to make this point plainer we will assume that the pinion L' has a diameter equal to four inches, and the cylinder W being receded from the position shown in Fig. 2 a distance of forty-three inches, said pinion meshing with the rack K' will have caused the shaft M' to make three and seven-twelfths of a revolution. The bevel-pinion $r'$ on said shaft being three inches in diameter and the gear-wheel O' in mesh therewith being twelve inches in diameter, the index-flange P' will have turned eight-ninths of a revolution and will show the forty-four-inch line in register with the index-plate Q'. Consequently the distance from the front of the knees to the saw is forty-four inches. The wheel S' being eighteen inches in diameter, the circumference thereof is approximately eight hundred and sixty-four sixteenths of an inch, and the serrations in this wheel are nine thirty-seconds of an inch apart and equal in number to the sixteenths in one foot of the rack K' multiplied by the circumference of the pinion L' in mesh therewith, and consequently there are one hundred and ninety-two serrations in said wheel, and each of these serrations equals one-sixteenth of an inch travel toward the saw. In case at any time the power to actuate the set-works should fail, the desired operation may be effected by a movement of the hand-wheel Y' on the shaft M' in gear with the stationary rack and index-wheel.

Having thus described my invention, what I claim as new, and desire to secure by Letters Patent, is—

1. A set of saw-mill dogs, rods connected to the dog-levers, a power-actuated shaft provided with arms that loosely engage the rods, and stops on the rods opposed to opposite sides of the arms, substantially as set forth.

2. A set of saw-mill dogs, rods connected to the dog-levers, a power-actuated shaft provided with arms that loosely engage the rods, rigid stops on said rods opposed to the arms in one direction, and yielding stops also arranged on the rods to oppose said arms in the opposite direction, substantially as set forth.

3. A set of saw-mill-dogs, rods connected to the dog-levers, a power-actuated shaft provided with arms, swivels carried by the arms and loosely engaged by the rods, and stops on said rods opposed to opposite sides of the swivels, substantially as set forth.

4. A set of saw-mill dogs, a shaft connecting all the dog levers and provided with an actuating-arm, a rod connected to the arm, and a power-reciprocated friction-grip engaging the rod, substantially as set forth.

5. A set of saw-mill dogs, a shaft connected to the dog-levers and provided with an actuating-arm, a rod connected to the arm and tapered for a portion of its length, a stationary guide for the rod provided with a gib, and a power-reciprocated grip for engagement with the thickest portion of said rod, substantially as set forth.

6. A set of saw-mill dogs, a shaft connected to the dog-levers and provided with an actuating-arm, a rod connected to the arm, a cylinder having connections for the admission and exhaust of fluid under pressure, a piston operative in the cylinder and provided with a rod, a cross-head on the piston-rod, guides for the cross-head, and a grip carried by said cross-head to actuate the shaft-arm rod, substantially as set forth.

7. A cant-hook comprising a pivotally-adjustable shank having sharp and blunt prongs extended in opposite directions therefrom, suitable means for locking the shank in its adjusted position, and a lifting mechanism connected to said shank, substantially as set forth.

8. A cant-hook comprising a shank, a sharp prong, and a blunt prong, a lifting mechanism connected to the shank, a collar loosely fitted to said shank, and clutch-arms for engagement with the collar and shank, substantially as set forth.

9. A cant-hook comprising a shank, a sharp prong, and a blunt prong, a lifting mechanism connected to the shank, a collar loosely fitted to said shank, a hand-bar, and spring-controlled clutch-levers pivoted to the hand-bar to engage the collar and shank, substantially as set forth.

10. A cant-hook, a hand-bar connected to the shank of the cant-hook, a lifting device provided with a rotary adjustable arm, and suitable means for connecting said cant-hook shank with said rotary adjustable arm of the lifting device, substantially as set forth.

11. A cant-hook, a lifting device provided with a rotary adjustable arm, a spring-controlled lever on the arm, a device loosely engaged by said arm and having its ends respectively connected to the cant-hook and spring-controlled lever, a set of saw-mill dogs, a shaft connected to the dog-levers and provided with an actuating-arm, a rod connected to the arm, and a grip carried by said lifting mechanism to engage the rod, substantially as set forth.

12. A set of saw-mill knees, a movable cylinder geared to the knees and having valve-controlled connections for the admission and exhaust of fluid under pressure, and a stationary piston arranged within the cylinder, substantially as set forth.

13. A movable cylinder having valve-controlled connections for the admission and exhaust of fluid under pressure, a power-actuated canting mechanism carried by the cylinder, and a stationary piston arranged within said cylinder, substantially as set forth.

14. A movable cylinder having valve-controlled connections for the admission and exhaust of fluid under pressure, a power set-works carried by the cylinder, and a stationary piston arranged within said cylinder, substantially as set forth.

15. A movable cylinder having valve-controlled connections for the admission and exhaust of fluid under pressure, a power-actuated dog mechanism carried by the cylinder, and a stationary piston arranged within said cylinder, substantially as set forth.

16. A set of saw-mill knees, a movable cylinder geared to the knees and having valve-controlled connections for the admission and exhaust of fluid under pressure, dogs arranged in the knees and having their levers connected to the power-actuated shaft movable with the cylinder and knees, a power-actuated canting mechanism also movable with the cylinder, a set-works carried by the cylinder, and a stationary piston arranged within said cylinder, substantially as set forth.

17. A movable horizontal cylinder having valve-controlled connections for the admission and exhaust of fluid under pressure, a stationary piston arranged within the cylinder, a vertical cylinder mounted on the horizontal one and also provided with connections for admission and exhaust of fluid under pressure, a piston operative within the vertical cylinder, a canting mechanism and friction-grip carried on the rod of the latter piston, a set of saw-mill dogs connected to a shaft having a connection for engagement with the friction-grip, and a set-works carried by said horizontal cylinder, substantially as set forth.

18. A set-works comprising a power-actuated vertical shaft provided with a horizontal wheel having a toothed hub and serrated periphery, an index-wheel in gear with said hub, a friction-brake engaged by the horizontal wheel, a graduated segment relative to the latter wheel, a pawl-clip adjustable on said horizontal wheel with relation to said segment, and a graduated plate opposed to the index-wheel, substantially as set forth.

19. A set-works comprising a power-actuated vertical shaft provided with a horizontal wheel having a toothed hub and serrated periphery, an index-wheel in gear with said hub, a friction-brake engaged by the horizontal wheel, a graduated segment relative to the latter wheel, a pawl-clip adjustable on the horizontal wheel with relation to said segment, a detent for said horizontal wheel, and a graduated plate opposed to the index-wheel, substantially as set forth.

20. A set-works comprising a stationary rack, a shaft having a pinion in mesh with the rack, a wheel fast on the shaft and having a diameter approximately four and one-half times that of the pinion, a toothed hub on the wheel approximate in diameter to three-fourths the diameter of said pinion, an index-wheel in mesh with said hub and approximately four times the diameter of the same, and a series of serrations in the periphery of the former wheel approximately equal in number to the sixteenths in one foot of the rack multiplied by the circumferences of the pinion in mesh therewith, a friction-brake engaged by the serrated wheel, a graduated segment relative to the latter wheel, a pawl-clip adjustable on said latter wheel with relation to the segment, and a graduated segment-plate opposed to the index-wheel, substantially as set forth.

21. A set-works having a power-actuated shaft, a set-wheel fast thereon and provided with upper and lower annular grooves, brake-blocks arranged to engage the grooves, pivotal levers connected to the brake-blocks, a spreader-cam arranged between the levers, and a foot-treadle having a lever-connection with said cam, substantially as set forth.

22. A set-works having the set-wheel thereof serrated upon the periphery, a clip adjustable on the set-wheel and provided with a pivoted spring-controlled pawl, and a cam-lever pivoted to the clip to actuate the pawl against the power of its spring, substantially as set forth.

23. A set-works having the set-wheel thereof serrated upon the periphery, a clip adjustable on the set-wheel and provided with a pivoted spring-controlled pawl having a hook on its outer end, a cam-lever pivoted to the clip to actuate the pawl against the power of its spring, and a stationary notch for engagement with the hook end of said pawl, substantially as set forth.

24. A set-works having the set-wheel thereof serrated upon the periphery, a clip adjustable on the set-wheel and provided with a pivotal spring-controlled pawl, a cam-lever pivoted to the clip to actuate the pawl against the power of its spring, a pivotal spring-controlled detent, and a pivoted cam-lever opposed to the detent, substantially as set forth.

25. A set-works comprising a stationary rack, a shaft having a pinion in mesh with the rack, a set-wheel fast on the shaft, an index-wheel geared to the set-wheel, and a hand-wheel also fast on said shaft, substantially as set forth.

26. A set-works comprising a stationary rack, a shaft having a pinion in mesh with the rack, a set-wheel fast on the shaft, an index-wheel geared to the set-wheel, a foot-controlled brake mechanism engaging said set-wheel, and a hand-wheel also fast on said shaft, substantially as set forth.

27. A cant-hook comprising a shank having two prongs, a grip having a ball-and-socket joint with one of the prongs, and a lifting mechanism connected to said shank, substantially as set forth.

In testimony that I claim the foregoing I have hereunto set my hand at Milwaukee, in the county of Milwaukee and State of Wisconsin, in the presence of two witnesses.

EDWIN BEARD.

Witnesses:
  H. G. UNDERWOOD,
  N. E. OLIPHANT.